United States Patent Office 2,871,234
Patented Jan. 27, 1959

2,871,234
ANTHRAQUINONE AZOIC PIGMENTS

Herman A. Bergstrom, Loudonville, N. Y., assignor to General Aniline & Film Corporation, New York, N. Y., a corporation of Delaware No Drawing. Application October 16, 1956
Serial No. 616,135

8 Claims. (Cl. 260—162)

This invention relates to improved anthraquinone azoic pigments, and the process of preparing them by oxidation of the leuco sulfuric acid ester of an anthraquinone azoic dye in the presence of a small amount of polymeric N-vinyl-α-pyrrolidone.

The leuco sulfuric acid esters of anthraquinone azoic dyes are well known in the art, having been described, for example, in U. S. Patent No. 1,924,744, which discloses the leuco sulfuric acid esters of anthraquinone azoic dyes, prepared from diazotized amino anthraquinone, and a 3-hydroxy-2-naphthoic acid arylide; and, also, in German Patent No. 539,115, which discloses sulfuric acid esters of azoic dyes from a diazotized amino anthraquinone and an acylacetarylide. These leuco sulfuric acid esters of anthraquinone azoic dyes are quite soluble in water, but are capable of being oxidized by methods known in the art to form pigments which have many desirable properties. However, oxidation of the leuco group, of these leuco sulfuric acid esters of anthraquinone azoic dyes, is frequently accompanied by some decomposition of the azo linkage, which causes a darkening of shade of the pigment product, with the result that it is difficult to obtain pigments having pure bright shades. I have now found that, if the oxidation of a leuco sulfuric acid ester of an anthraquinone azoic dye is carried out in the presence of a small amount of polymeric N-vinyl-α-pyrrolidone, (hereinafter referred to as polyvinyl pyrrolidone) the resulting pigment is much brighter, and has a greater color value than is the case when the oxidation is effected under similar conditions, in the absence of the polyvinyl pyrrolidone.

The leuco sulfuric acid esters of anthraquinone azoic dyes, which may be used for the production of the novel products of this invention, and which, as indicated, are known in the art, may be represented by the following general formula:

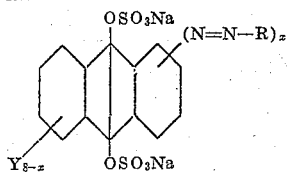

wherein R represents the residue of a known azoic coupling component, e. g., residue of an o-hydroxyarylcarboxylic acid arylide, an acylacetarylide, or a derivative of 1-aryl-5-pyrazolone, which compounds are free of solubilizing groups, usually sulfuric or carboxylic acid groups; $x$ represents 1 or 2, and Y represents hydrogen or a substituent known in anthraquinone azoic dyes, which does not effect, materially, the solubility properties.

Suitable leuco sulfuric acid esters of anthraquinone azoic dyestuffs, which may be used in the process of the present invention, for producing the novel products thereof, include those disclosed in the following United States patents:

U. S. P. 1,924,774, of August 29, 1933
U. S. P. 2,316,758, of April 20, 1943
U. S. P. 2,347,027, of April 18, 1944, and
U. S. P. 2,617,798, of November 11, 1952

By way of further specific illustration of the leuco sulfuric acid esters of anthraquinone azoic dyes, which may be used in practicing the present invention, there may be mentioned the products obtained by coupling diazonium salts produced from the leuco sulfuric acid esters of such amino anthraquinones as 1-aminoanthraquinone
2-aminoanthraquinone
2-amino-3-chloroanthraquinone
2-amino-1-chloroanthraquinone
2,6-diaminoanthraquinone
1-amino-3-chloroanthraquinone with an azoic type coupling component, such as an o-Hydroxyarylcarboxylic acid arylide, e. g.:
  3-hydroxy-2-naphthanilide
  3-hydroxy-2-naphth-o-anisidide
  3-hydroxy-2-naphth-4'-chloro-o-toluidide
  3-hydroxy-2-anthranilide
  3-hydroxy-2-carbazolecarboxanilide
  2-hydroxy-3-dibenzofurancarboxanilide, or an Acylacetarylide, e. g.:
  Acetoacetanilide
  Benzoylacetanilide
  Acetoacet-o-toluidide
  Acetoacet-o-anisidide
  Bisacetoacet-o-toluidide
  Terephthaloyl bis(acet - 5 - chloro - 2,4-dimethoxy-anilide), or a Pyrazolone, e. g.:
  1-phenyl-3-methyl-5-pyrazolone
  1-(3-sulfamylphenyl)-3-methyl-5-pyrazolone
  1-phenyl-3-carbethoxy-5-pyrazolone
  1-(2,5-dichlorophenyl)-3-methyl-5-pyrazolone and the metallized o,o'-dihydroxy azo compounds, as disclosed in U. S. Patent 2,135,433, from o-aminophenol-resorcinol and derivatives.

The oxidizing agent for conversion of the leuco sulfuric esters to the pigment form may be any of the usual agents, employed in a calculated equivalent amount of oxidizing agent per leuco to be oxidized, up to about a 150% excess. Hydrogen peroxide, potassium permanganate, sodium dichromate and ferric chloride may be used. I have found sodium nitrite to be particularly effective, since it is inexpensive, easy to use and leaves no undesirable metallic by-products.

The polyvinyl pyrrolidone employed in practicing the present invention is a water-soluble polymer obtained by polymerization of N-vinyl-α-pyrrolidone, and is described, with its methods of preparation, for example, in U. S. Patents 2,265,450, of December 9, 1941, and 2,335,454, of November 30, 1943. The molecular weight of the polyvinyl pyrrolidone does not appear to be highly critical, and polymers having molecular weights of more than 5,000 to 80,000 have been found to be satisfactory. Polyvinyl pyrrolidone having an average molecular weight in the range of 25,000 to 40,000 is commercially available, and is preferred for use in the present invention. The viscosity coefficient K value (fully described in Modern Plastics, vol. 23, No. 3, pp. 157 et seq. (1945)) is commonly employed as an indication of the average molecular weight of the polyvinyl pyrrolidone, and commercially available polyvinyl pyrrolidone having a K value of 30 is preferred on account of its availability. However, polymers having K values ranging from 10 or 15 to 90, have been found to be operative, without any noticeable differences in the resulting product, attributable to the K value of the particular polymer employed. Polymers having a K value above 90, begin, however, to exhibit substantially decreased water-solubility, and are, therefore less preferred.

In brief outline, the preferred method of practicing the invention is as follows:

The leuco sulfuric ester is dissolved in water to form about a 1-10% solution. To this is added sufficient PVP to form a .001-5% solution. The oxidizing agent is added under oxidizing conditions. It has been found advantageous to warm for a while, for example ½-5 hrs., at a temperature ranging from about 60° C. to 90° C. The pigment is filtered, washed and dried in any suitable manner; or if desired, the pigment may be used as paste.

The details of the present invention will be apparent to those skilled in the art, from a consideration of the following examples which illustrate the invention:

Example 1

31.65 g. (.045) mole) of the leuco sulfuric acid ester of the formula:

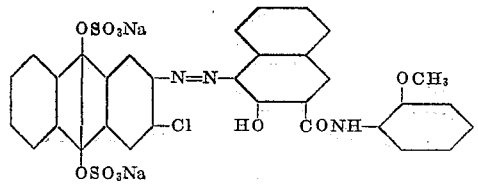

was dissolved in 1,000 cc. water. 6.5 g. sodium nitrite and .1 g. polyvinyl pyrrolidone (K-30) were added. After heating to 70-75° C., 2 g. 2-ethylhexanol were added, followed by slow addition of 50 g. HCl 20° Bé. After the nitrogen oxide fumes were liberated, the charge was heated to 75-85° C. for 1 hr. The pigment was filtered, washed and dried.

1 g. of dry pigment was thoroughly mixed and milled with 2 g. of a commercially purchased transparent lithographic varnish. 1.25 g. of this masstone was reduced by mixing and milling with 2 cc. of a commercial zinc white ink (zinc oxide in linseed oil). A drawdown of pigment composition on bond paper gave a yellower and brighter shade than a drawdown from this pigment composition made in similar manner without the polyvinyl pyrrolidone. Also, the masstone had considerable higher color value.

Example 2

Example 1 was repeated, using 27.6 g. (.045 mole) of a leuco sulfuric acid ester of the formula:

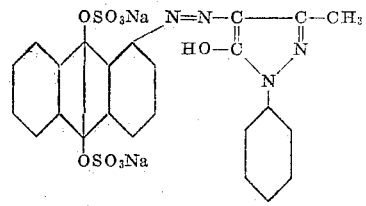

A bright yellow pigmentation was obtained on a drawdown.

Example 3

Example 1 was repeated, using 29.3 g. (.045 mole) of a leuco sulfuric acid ester of the formula

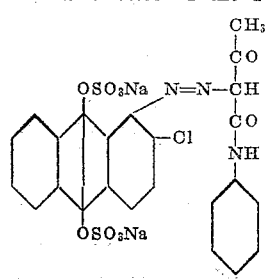

A bright yellow pigmentation was obtained on the drawdown.

Example 4

Example 1 was repeated, using twice the amount of nitrite, and using 59.8 g. (.045 mole) of a leuco sulfuric acid ester of the formula:

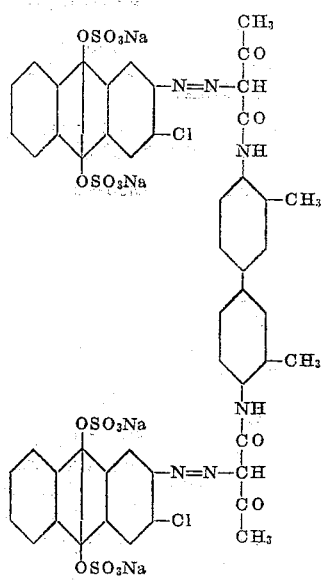

A bright yellow pigmentation was obtained on the drawdown.

Example 5

Example 1 was repeated, using 32.9 g. (.045 mole) of a leuco sulfuric acid ester of the formula:

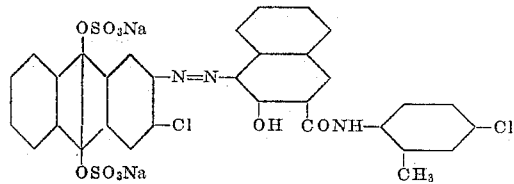

A bright red pigmentation was obtained on the drawdown.

Example 6

31.65 g. (.045 mole) of the leuco sulfuric acid ester of Example 1 was dissolved in 1,000 cc. water, to which .1 g. of polyvinyl pyrrolidone had been added. The solution was warmed to 75° C. 75 cc. 30% ferric chloride solution, and 45 cc. hydrochloric acid 20° Bé. were combined and added to the leuco solution. After boiling for 1½ hours at 80-85° C., filtering, washing and drying, a pigment was produced commensurate with that of Example 1.

Example 7

31.65 g. (.045 mole) of the leuco ester of Example 1 was dissolved in 1,400 cc. water, to which .1 g. of polyvinyl pyrrolidone had been added. To this was added 50 cc. of 35% hydrogen peroxide and 45 cc. hydrochloric acid 20° Bé. After heating at 75-85° C. for 1 hour, the pigment was filtered; the result was commensurate with that of Example 1.

Example 8

Example 1 was repeated, using 34.6 g. (.045 mole) of a metallized leuco sulfuric acid of the formula:

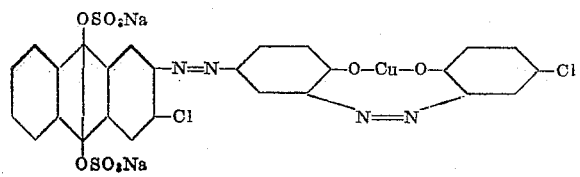

A dark brown pigmentation was obtained on a drawdown. In place of the copper complex used in this example, the complexes with other metals (e. g. Fe, Cr, Ni, Co, etc.), capable of yielding azo dyestuff complex compounds, may be used.

It will be noted that the foregoing examples are illustrative only of the present invention, and that the process of the present invention is broadly applicable to the production of anthraquinone azoic pigments by the oxidation of a leuco sulfuric acid ester of an anthraquinone azoic dyestuff, the presence of a small amount of polyvinyl pyrrolidone during the oxidizing step, in accordance with this invention, causing the resulting pigment to be substantially brighter, and of greater color value than is the case when the oxidation was effected with the same dyestuff, under other similar conditions, but in the absence of polyvinyl pyrrolidone. It has been found that only small amounts of polyvinyl pyrrolidone are required, in order to effect improvement in the properties of the pigment. As little as 0.001 percent concentration of polyvinyl pyrrolidone in the oxidizing bath, being sufficient to effect noticeable improvement in the color of the pigment. In general, the amount of PVP in the aqueous bath, in which the oxidation was effected, of from 0.005 to 0.05%, is preferred. Substantially, very much larger amounts, up to 5%, of polyvinyl pyrrolidone in the oxidizing bath, have been used without adverse effect that such large amounts are necessary.

I claim:

1. In the process of producing anthraquinone azoic pigments, wherein a water-soluble leuco sulfuric acid ester of an anthraquinone azoic dyestuff, free of water-solubilizing groups other than leuco sulfuric acid ester groups obtained by coupling a diazotized leuco sulfuric acid ester of an aminoanthraquinone free of water-solubilizing groups other than the leuco sulfuric acid ester groups with an azoic coupler which is free of water-solubilizing groups, is subjected, in an aqueous medium, to the action of an oxidizing agent; the improvement which comprises carrying out said oxidizing step in the presence of from about 0.001 to 5% of the total weight of the aqueous mixture being oxidized of a water-soluble polymer of N-vinyl-α-pyrrolidone.

2. The process as defined in claim 1, wherein the oxidizing agent is sodium nitrite.

3. The process as defined in claim 1, wherein the leuco sulfuric acid ester of the anthraquinone azoic dyestuff, which is oxidized, is a leuco sulfuric acid ester of an anthraquinone azoic dyestuff, obtained by coupling a diazotized amino anthraquinone, which is free of solubilizing groups, other than leuco sulfuric acid ester groups, with an o-hydroxyarylcarboxylic acid arylide azoic coupling component, which is free of solubilizing groups.

4. The process as defined in claim 3, wherein the oxidizing agent is sodium nitrite.

5. The process as defined in claim 1, wherein the leuco sulfuric acid ester of the anthraquinone azoic dyestuff, which is oxidized, is a leuco sulfuric acid ester of an anthraquinone azoic dyestuff, obtained by coupling a diazotized amino anthraquinone, which is free of solubilizing groups, other than leuco sulfuric acid ester groups, with an acylacetarylide.

6. The process as defined in claim 5, wherein the oxidizing agent is sodium nitrite.

7. The process as defined in claim 1, wherein the leuco sulfuric acid ester of the anthraquinone azoic dyestuff, which is oxidized, is a leuco sulfuric acid ester of an anthraquinone azoic dyestuff, obtained by coupling a diazotized amino anthraquinone, which is free of solubilizing groups, other than leuco sulfuric acid ester groups, with a 1-aryl-5-pyrazolone.

8. The process as defined in claim 7, wherein the oxidizing agent is sodium nitrite.

References Cited in the file of this patent

UNITED STATES PATENTS

| | | |
|---|---|---|
| 1,924,774 | Fairweather et al. | Aug. 29, 1933 |
| 2,215,555 | Lord et al. | Sept. 24, 1940 |
| 2,273,116 | Kranzlein et al. | Feb. 7, 1942 |
| 2,346,922 | Johnson | Apr. 18, 1944 |

OTHER REFERENCES

Vinyl Polymers, Schildknecht, 1952, page 677.
Vat Dyes, AATCC Monograph No. 2, 1953, pages 261, 262, 269, 278, 279.